(12) United States Patent
Ishigame et al.

(10) Patent No.: US 9,079,618 B2
(45) Date of Patent: Jul. 14, 2015

(54) UPPER VEHICLE-BODY STRUCTURE OF VEHICLE

(71) Applicant: Mazda Motor Corporation, Aki-gun, Hiroshima (JP)

(72) Inventors: Katsuyoshi Ishigame, Hiroshima (JP); Yuichi Sugimura, Higashihiroshima (JP); Sakayu Terada, Hiroshima (JP); Keizo Kawasaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/137,382

(22) Filed: Dec. 20, 2013

(65) Prior Publication Data
US 2014/0175839 A1 Jun. 26, 2014

(30) Foreign Application Priority Data
Dec. 26, 2012 (JP) ................. 2012-282023

(51) Int. Cl.
*B62D 25/04* (2006.01)
*B62D 25/06* (2006.01)

(52) U.S. Cl.
CPC ................ *B62D 25/06* (2013.01); *B62D 25/04* (2013.01)

(58) Field of Classification Search
CPC ...... B65D 25/04; B65D 25/06; B65D 27/023; B65D 25/07; B65D 27/00; B65D 27/02
USPC ............. 296/29, 30, 187.12, 187.13, 193.06, 296/203.03
See application file for complete search history.

(56) References Cited

U.S. PATENT DOCUMENTS

| | | | | |
|---|---|---|---|---|
| 5,213,391 A | * | 5/1993 | Takagi | 296/205 |
| 5,873,618 A | * | 2/1999 | Ejima | 296/30 |
| 8,210,602 B2 | * | 7/2012 | Kobayashi et al. | 296/203.03 |
| 2004/0212222 A1 | * | 10/2004 | Katsuma | 296/203.03 |
| 2008/0122259 A1 | * | 5/2008 | Matsui | 296/187.12 |
| 2010/0052369 A1 | * | 3/2010 | Park | 296/210 |
| 2012/0153676 A1 | * | 6/2012 | Shono | 296/193.06 |
| 2013/0214559 A1 | * | 8/2013 | Vantrease et al. | 296/187.12 |

FOREIGN PATENT DOCUMENTS

JP 2009-067328 A 4/2009

* cited by examiner

*Primary Examiner* — Jason S Daniels
(74) *Attorney, Agent, or Firm* — Studebaker & Brackett PC

(57) ABSTRACT

A pair of right-and-left roof rails, a roof panel provided between the roof rails, a roof reinforcement extending in a vehicle width direction below the roof panel, a center pillar, and a gusset joined to an end portion, in the vehicle width direction, of the roof reinforcement are provided. Further, a node-shaped plate member is provided inside the roof rail at a position which overlaps the roof reinforcement longitudinally and vertically. Accordingly, buckling of a portion of the roof reinforcement which is located in the vicinity of a roof side can be restrained.

12 Claims, 13 Drawing Sheets

UPPER VEHICLE-BODY STRUCTURE OF VEHICLE

BACKGROUND OF THE INVENTION

The present invention relates to an upper vehicle-body structure of a vehicle, and specifically to an upper vehicle-body structure of a vehicle which comprises a pair of right-and-left roof rails provided at right-and-left both end portions of a roof portion of the vehicle and extending in a vehicle longitudinal direction, a roof panel provided between the pair of right-and-left roof rails, a roof reinforcement extending in the vehicle width direction below the roof panel, and a center pillar extending vertically at a side portion of a vehicle body.

Conventionally, the following structure is known as the above-described upper vehicle-body structure of a vehicle. That is, that is a front vehicle-body structure of a vehicle comprising a pair of right-and-left roof rails provided at right-and-left both end portions of a roof portion of the vehicle and extending in a vehicle longitudinal direction, the roof rail having a panel joint portion (a so-called Mohican portion) having a recess-shaped cross section where plural panels are overlapped vertically and joined together at an inward end portion, in a vehicle width direction, of the roof rail, a roof panel provided between the pair of right-and-left roof rails, a roof reinforcement extending in the vehicle width direction below the roof panel, a center pillar, an upper portion of which is joined to the roof rail at a position which overlaps the roof reinforcement in the vehicle longitudinal direction, the center pillar extending downward from the upper portion thereof, and a gusset joined to an end portion, in the vehicle width direction, of the roof reinforcement.

In the above-described conventional structure, since a side-collision load is inputted to the center pillar in a vehicle side collision, a torsional load is transmitted from the center pillar to the roof rail. Herein, since the above-described panel joint portion (Mohican portion) is not a structure having a closed cross section, the spot welding of the panel joint portion may get broken, thereby the section of the roof rail may crush, so that a moment occurring at this time may cause bucking of a portion of the roof reinforcement which is located in the vicinity of a roof side. Consequently, there is a concern that the center pillar may improperly come into a vehicle compartment greatly. Herein, it may be considered that the thickness of the center pillar is designed to be thicker or a reinforcing member is additionally provided in order to restrain the center pillar from coming into the vehicle compartment. In this case, however, there is a problem in that the weight of the vehicle body may become heavy.

An upper vehicle-body structure of a vehicle disclosed in Japanese Patent Laid-Open Publication No. 2009-67328 has been invented to solve the above-described problem. The structure disclosed in the above-described patent document comprises a roof rail extending in the vehicle longitudinal direction and having a closed cross section formed by a roof rail outer and a roof rail inner, a roof reinforcement extending in the vehicle width direction below a roof panel, and a gusset connecting an inward end portion, in the vehicle width direction, of the roof reinforcement and the roof rail inner, wherein a step portion is formed at a central portion, in the vehicle width direction, of the gusset so that a stress can be focused on the step portion in a vehicle side collision so as to bend the gusset around at the step portion. Thereby, the bending moment transmitted to the roof reinforcement may be decreased properly. However, the decrease of the bending moment may not be sufficient yet, so there is a room to make improvements.

SUMMARY OF THE INVENTION

An object of the present invention is to provide an upper vehicle-body structure of a vehicle which can effectively restrain the buckling of the portion of the roof reinforcement which is located in the vicinity of the roof side.

According to the present invention, there is provided an upper vehicle-body structure of a vehicle, comprising a pair of right-and-left roof rails provided at right-and-left both end portions of a roof portion of the vehicle and extending in a vehicle longitudinal direction, the roof rail having a panel joint portion having a recess-shaped cross section where plural panels are overlapped vertically and joined together at an inward end portion, in a vehicle width direction, of the roof rail, a roof panel provided between the pair of right-and-left roof rails, a roof reinforcement extending in the vehicle width direction below the roof panel, a center pillar, an upper portion of which is joined to the roof rail at a position which overlaps the roof reinforcement in the vehicle longitudinal direction, the center pillar extending downward from the upper portion thereof, a gusset joined to an end portion, in the vehicle width direction, of the roof reinforcement, and a node-shaped plate member provided inside the roof rail at a position which overlaps the roof reinforcement longitudinally and vertically.

According to the present invention, since the node-shaped plate member is provided inside the roof rail at the position which overlaps the roof reinforcement longitudinally and vertically, so that the shape of the cross section of the roof rail can be maintained by the node-shaped plate member so that the cross section of the roof rail does not crush improperly in the vehicle side collision, the side-collision load can be transmitted substantially in the axial direction of the roof reinforcement via the gusset in a state in which its bending element is properly small. Accordingly, the buckling of the portion of the roof reinforcement which is located in the vicinity of the roof side can be effectively restrained. Herein, there is a concern that in a case in which the side-collision load is inputted to the position below the roof reinforcement, a bending force may act so that the roof reinforcement deforms improperly greatly. In order to prevent this situation, it may be necessary to additionally provide some member for increasing the strength. This causes a weight increase improperly. The present invention described above, however, can properly transmit the side-collision load substantially in the axial direction of the roof reinforcement so as to solve the above-described concern without any improper weight increase.

According to an embodiment of the present invention, the roof rail comprises a roof rail outer and a roof rail inner, a gusset-facing face of the roof rail inner which is arranged substantially perpendicularly to an axial direction of the roof reinforcement forms a load-transmission face, and a center of a cross section of the roof rail is located at a position which overlaps the load-transmission face vertically. Thereby, since the load-transmission face and the end portion of the roof reinforcement are substantially in parallel to each other and the center of the cross section (i.e., the gravity center) of the roof rail is located at the position overlapping the load-transmission face vertically, the side-collision load can be transmitted substantially in the axial direction of the roof reinforcement in a state in which the cross section of the roof rail does not crush, so that the buckling of the portion of the roof reinforcement located in the vicinity of the roof side can be effectively restrained.

According to another embodiment of the present invention, the upper portion of the roof rail projects upward beyond the panel joint portion such that the center of the cross section of the roof rail is located at a position which overlaps the load-transmission face vertically. Herein, the upper portion of the roof rail projecting upward beyond the panel joint portion may include an upper portion of the node-shaped plate member and an upper portion of a roof rail outer reinforcement. According to the above-described embodiment, the center of the cross section (the gravity center) of the roof rail can be located at the position overlapping the load-transmission face vertically with a relatively simple structure. Accordingly, the side-collision load can be transmitted substantially in the axial direction of the roof reinforcement in the vehicle side collision despite its simple structure, so that the buckling of the portion of the roof reinforcement located in the vicinity of the roof side can be effectively restrained.

According to another embodiment of the present invention, the roof reinforcement and the gusset are not joined to the panel joint portion such that a separate portion where the roof rail and the gusset are apart from each other is formed, or a weakness portion is formed in the vicinity of a connection portion of the roof rail and the gusset. Thereby, since the above-described separate portion or weakness portion are provided, the upper portion of the center pillar and a portion of the roof rail which corresponds to this portion can be made, in an initial stage of the vehicle side collision, to deform freely in the range of the separate portion, or can make the weakness portion properly crush. Accordingly, the side-collision load is not inputted to the roof reinforcement in the initial stage of the vehicle-side collision, so that this load can be received by a torsional deformation and a bending deformation of the roof rail. Then, since the decreased load is transmitted to the roof reinforcement, the buckling of the portion of the roof reinforcement located in the vicinity of the roof side can be effectively restrained. Further, since the roof reinforcement and the gusset are not joined to the panel joint portion (Mohican portion) so that there is provided a non-joint structure, it can be prevented that the welding of the panel joint portion gets separated (i.e., the spot welding of the panel joint portion gets broken). Herein, in a case in which the roof reinforcement and the gusset are joined to the panel joint portion, the panel joint portion is pulled by the gusset when deforming, so that there is a concern that the welding portion may get separated. In order to prevent this situation, it may be necessary to additionally provide some member for increasing the strength or more welding portions. However, this may cause a weight increase or deterioration of the productively improperly, so there is a room to make improvements in the above-described case in which the roof reinforcement and the gusset are joined to the panel joint portion.

According to another embodiment of the present invention, the separate portion or the weakness portion are positioned below the panel joint portion. Thereby, since the separate portion or the weakness portion are positioned below the panel joint portion, i.e., at as an outward position in the vehicle width direction as possible, the distance between a load input point (see the center of the cross section of the closed cross section of the roof rail) and an acting point can be properly small. Accordingly, the bending moment for the roof reinforcement can be small, so that the small load of the bending moment can be transmitted to the roof reinforcement. Consequently, the buckling of the portion of the roof reinforcement located in the vicinity of the roof side can be effectively restrained.

According to another embodiment of the present invention, the load-transmission face and a facing face of an end portion of the gusset are arranged substantially in parallel to each other at the separate portion. Thereby, the side-collision load is transmitted substantially in the axial direction of the roof reinforcement when being inputted in the vehicle side collision, and when the load-transmission face of the roof rail inner and the facing face of the end portion of the gusset collide with each other, the panel joint portion, the load-transmission face of the roof rail inner, and the gusset constitute together substantially a U-shaped structure having a properly-high rigidity. Accordingly, the panel joint portion can be restrained from getting separated by a reaction force which is transmitted from the gusset to the roof rail.

According to another embodiment of the present invention, a facing portion which is substantially in parallel to the load-transmission face is formed at a position which corresponds to an inward end portion, in the vehicle width direction, of the weakness portion. Herein, the above-described facing portion may be comprised of a facing face or a facing side, such as a vertical wall side. According to the above-described embodiment, since the load-transmission face of the roof rail inner and the facing portion of the gusset are configured to be located substantially in parallel to each other, the side-collision load is transmitted substantially in the axial direction of the roof reinforcement when being inputted in the vehicle side collision, and also the gusset is configured to be attachable to the roof rail inner, so that assembling to the vehicle body can be improved properly.

Other features, aspects, and advantages of the present invention will become apparent from the following description which refers to the accompanying drawings.

DETAILED DESCRIPTION OF THE INVENTION

Figure 1:
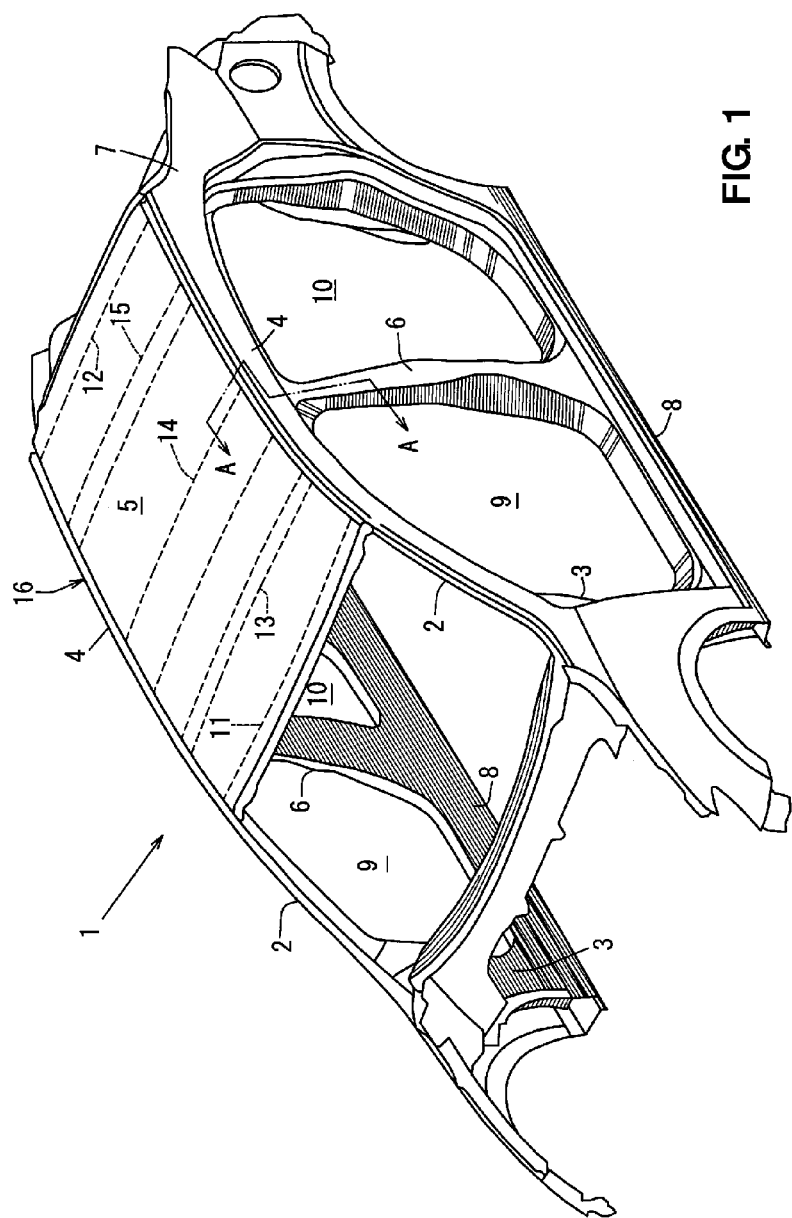
FIG. 1 is a perspective view of a vehicle body equipped with an upper vehicle-body structure of a vehicle according to the present invention.
Figure 2:
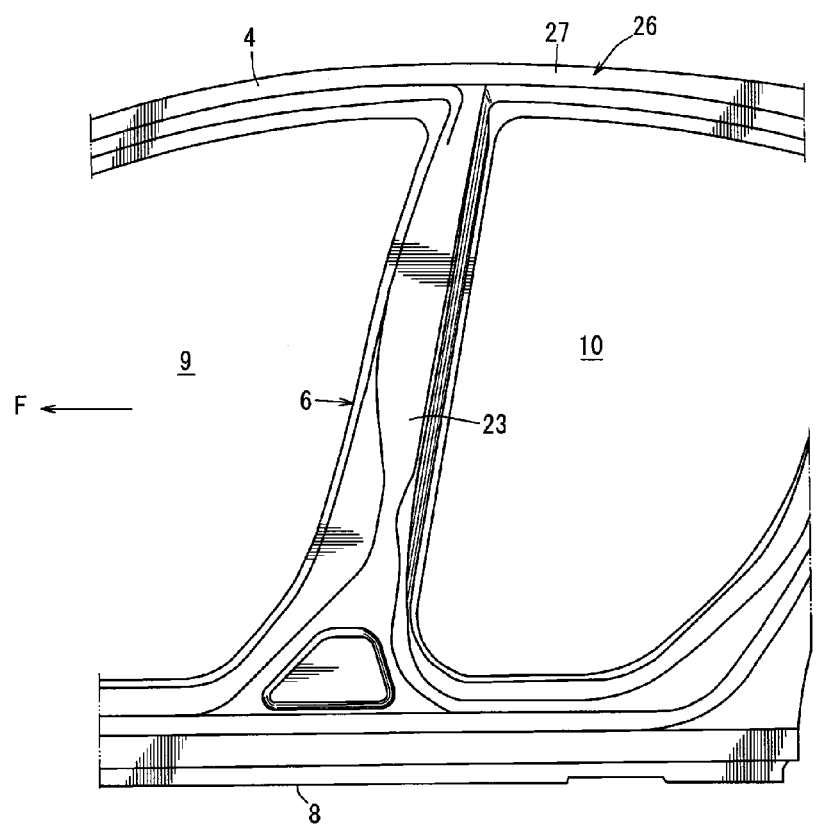
FIG. 2 is an enlarged side view of a major part of FIG. 1.
Figure 3:
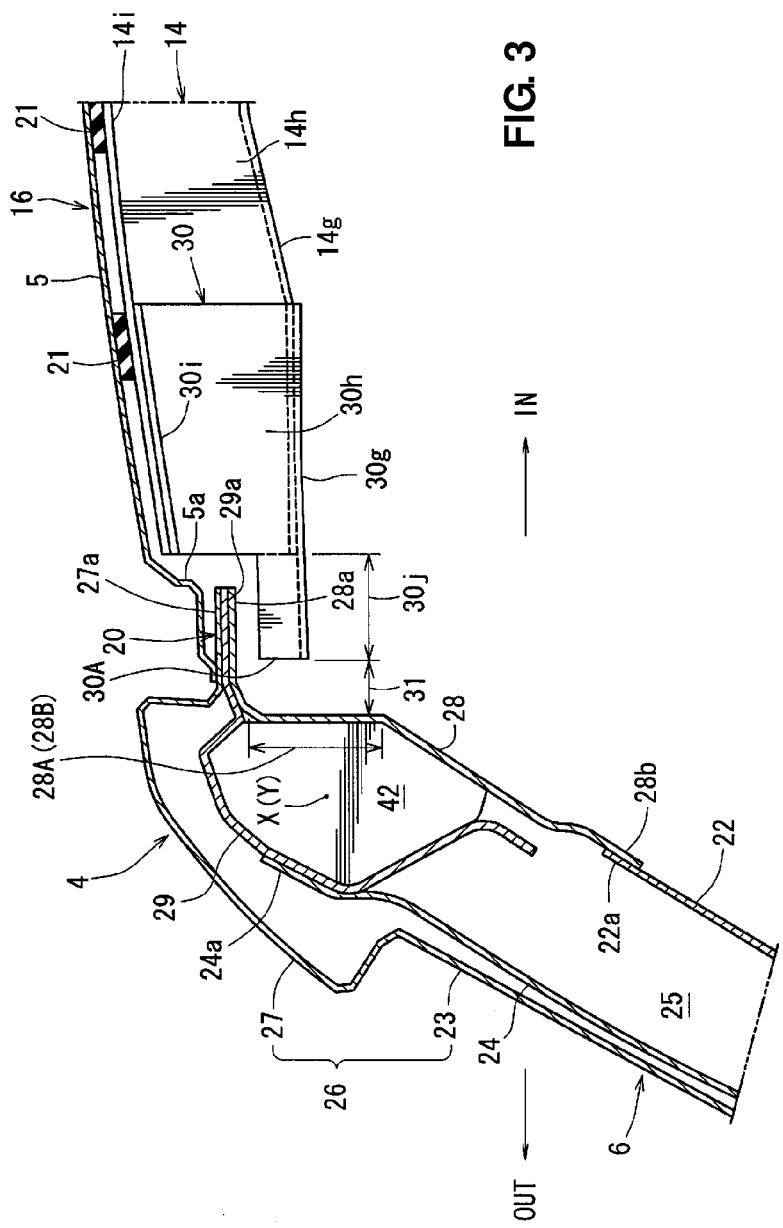
FIG. 3 is a sectional view taken along line A-A of FIG. 1.

Hereinafter, a preferred embodiment of the present invention will be described specifically referring to the accompanying drawings. The drawings show an upper vehicle-body structure of a vehicle. FIG. 1 is a perspective view of a vehicle body equipped with an upper vehicle-body structure of a vehicle according to the present invention, FIG. 2 is an enlarged side view of a major part of FIG. 1, and FIG. 3 is a sectional view taken along line A-A of FIG. 1. Herein, while a left side of the upper vehicle-body structure will be explained, the upper vehicle-body structure according to the present embodiment is configured to be substantially symmetrical about a center line of the vehicle.

As shown in FIG. 1, a vehicle body 1 of the present embodiment comprises right and left front pillars 2, 2 which support right-and-left both-side portions of a windshield (not illustrated) and have a structure equipped with a closed cross section, and a hinge pillar 3 extending vertically is connected to a lower portion of the front pillar 2. The hinge pillar 3 is a vehicle rigidity member equipped with a hinge-pillar closed cross section which is formed by a hinge pillar outer and a hinge pillar inner which are joined together and extends vertically.

A pair of right-and-left roof rails 4, 4 which extend in a vehicle longitudinal direction are formed continuously at rear ends of the right and left front pillar 2. An area between the pair of right-and-left roof rails 4, 4 is covered with a roof panel 5 which is made of a steel plate and provided to expand in the vehicle width direction at an upper portion of the vehicle body.

Further, as shown in FIG. 1, a center pillar 6 which has a structure equipped with a closed cross section and extends vertically is formed continuously at a middle portion (a central portion according to the present embodiment), in the vehicle longitudinal direction, of the roof rail 4 extending in the vehicle longitudinal direction. Also, a rear pillar 7 which has a structure equipped with a closed cross section and extends vertically is formed continuously at a rear end portion of the roof rail 4.

Also, as shown in FIG. 1, a side sill 8 which has a structure equipped with a closed cross section and extends vehicle rearward from a lower portion of the hinge pillar 3 is formed at a lower portion of the vehicle body. As shown in FIGS. 1 and 2, a central portion, in the vehicle longitudinal direction, of the side sill 8 and a central portion, in the vehicle longitudinal direction, of the roof rail 4 are interconnected vertically by the above-described center pillar 6. And, at the vehicle body 1 there are provided a front-door opening 9 which is enclosed by the hinge pillar 3, the front pillar 2, the roof rail 4, the center pillar 6, and the side sill 8, and a rear-door opening 10 which is enclosed by the center pillar 6, the roof rail 4, the rear pillar 7, and the side sill 8.

As shown in FIG. 1, a front header 11 and a rear header 12 which have substantially a closed cross section, respectively, are joined to front and rear portions of the roof panel 5. These front and rear headers 11, 12 are vehicle-body rigidity members which extend in the vehicle width direction at the front and rear portions of the roof panel 5, respectively.

Further, plural roof reinforcements 13, 14, 15 extending in the vehicle width direction are provided between the front header 11 and the rear header 12 below the roof panel 5 (on the side of the vehicle compartment). A roof portion 16 is formed by the roof panel 5, the front header 11, the rear header 12, and the plural roof reinforcements 13, 14, 15. Herein, the roof reinforcement 14 which is located at a position corresponding to the center pillar 6 is configured to have a width in the vehicle longitudinal direction which is greater than those of the other roof reinforcements 13, 15.

As shown in the sectional view of FIG. 3, the above-described roof rails 4 extend longitudinally at right and left both-side portions (both end portions in the vehicle width direction) of the roof portion 16. And, at an inward end portion, in the vehicle width direction, of the roof rail 4 is formed a panel joint portion 20 (a so-called Mohican portion) having a recess-shaped cross section where plural panels are overlapped vertically and joined together. Herein, the plural panels are comprised of a bending portion 27a which is a step-shaped inward end portion of a roof rail outer portion 27, which will be described later, an inward end portion 29a of the roof rail outer reinforcement 29, and an upper and inward end portion 28a of the roof rail inner 28.

The above-described roof panel 5, which is arranged between the pair of right-and-left roof rails 4, 4, has substantially an L-shaped bending portion 5a at an inward end portion, in the vehicle width direction, of the roof panel 5. An outward lower portion of the bending portion 5a is joined to an upper face of the panel joint portion 20. The roof reinforcement 14 extending in the vehicle width direction below the roof panel 5 is adhesively fixed to a lower face of the roof panel 5 by an adhesive agent 21 at a position corresponding to the center pillar 6 as shown in FIG. 3. Herein, the other roof reinforcements 13, 15 are adhesively fixed to the lower face of the roof panel 5 by an adhesive agent, not illustrated.

Figure 7:
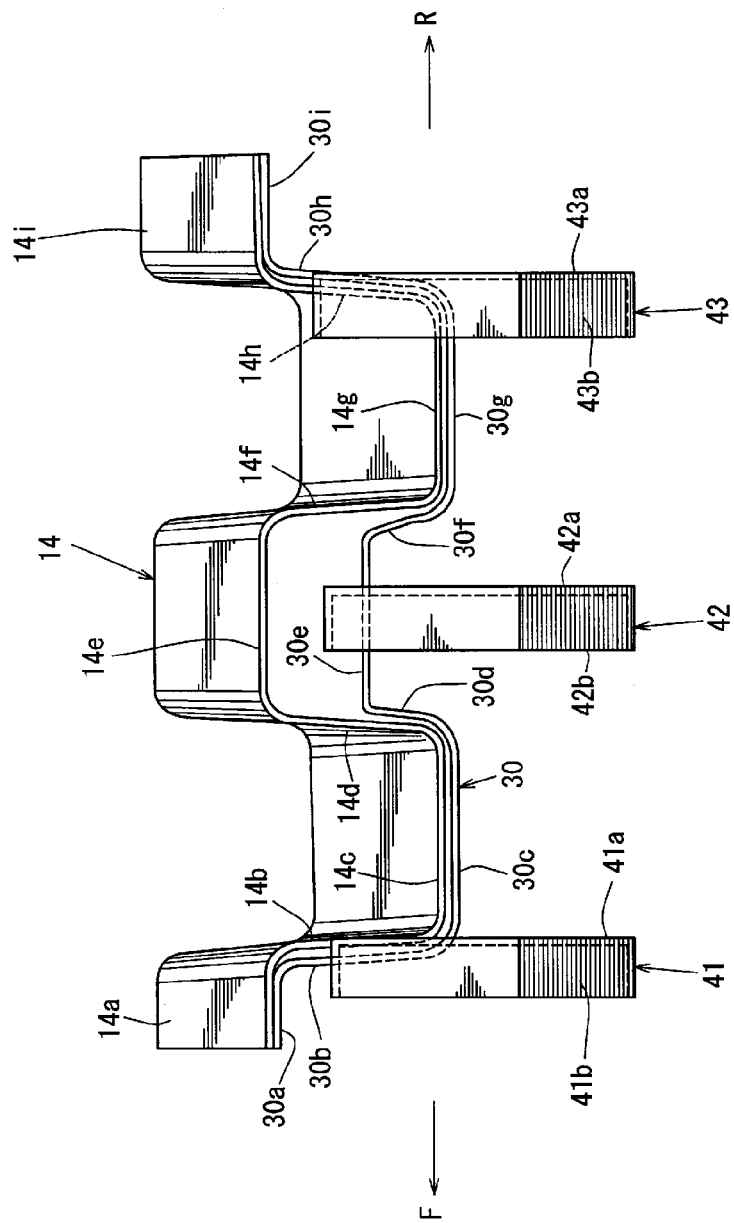
FIG. 7 is a side view showing a relationship of the node-shaped plate members, the roof reinforcement, and the gusset.

The above-described roof reinforcement 14 comprises, as shown in the side view of FIG. 7, a front-side flange portion 14a, a front piece portion 14b extending downward from a rear end of the flange portion 14a, a bottom piece portion 14c extending rearward from a lower end of the front piece portion 14b, a middle vertical wall portion 14d rising upward from a rear end of the bottom piece portion 14c, an upper piece portion 14e extending rearward from an upper end of the middle vertical wall portion 14d, a middle vertical wall portion 14f extending downward from a rear end of the upper piece portion 14e, a bottom piece portion 14g extending rearward from a lower end of the middle vertical wall portion 14f, a rear piece portion 14h rising upward from a rear end of the bottom piece portion 14g, and a rear-side flange portion 14i extending rearward from an upper end of the rear piece portion 14h, which are integrally formed substantially in a W shape in the side view. An upper portion of the above-described center pillar 6 is joined to the roof rail 4 at a position which overlaps the roof reinforcement 14 in the vehicle longitudinal direction, and the center pillar 6 extends downward and its lower portion is joined to the side sill 8.

As shown in FIG. 3, the center pillar 6 comprises a center pillar inner 22, a center pillar outer 23, and a center pillar outer reinforcement 24, which is a vehicle-body strength member equipped with a center-pillar closed cross section 25 extending vertically. Herein, the above-described center pillar outer portion 23 is formed by a part of a side outer panel 26 (vehicle-body outer plate) forming a vehicle-body outer face, and another part of the side outer panel 26 forms the roof rail outer portion 27. Further, as shown in FIG. 3, the roof rail 4 is comprised of a roof rail outer portion 27 located on a vehicle-outward side, a roof rail inner 28 located in the vehicle-inward side, and a roof rail outer reinforcement 29 located between the both 27, 28. The above-described panel joint portion 20 (the so-called Mohican portion) having the recess-shaped cross section is configured by the bending portion 27a of the step-shaped inward end portion of the roof rail outer portion 27, the inward end portion 29a of the roof rail outer reinforcement 29, and the upper and inward end portion 28a of the roof rail inner 28 which are vertically joined together by a welding means, such as spot welding. As shown in FIG. 3, an upper end portion 22a of the center pillar inner 22 is jointly fixed to a lower end portion 28b of the roof rail inner 28, and an upper end portion 24a of the center pillar outer reinforcement 24 is jointly fixed to a middle portion, in a vertical direction, of the roof rail outer reinforcement 29 on the vehicle-outward side.

Figure 4:
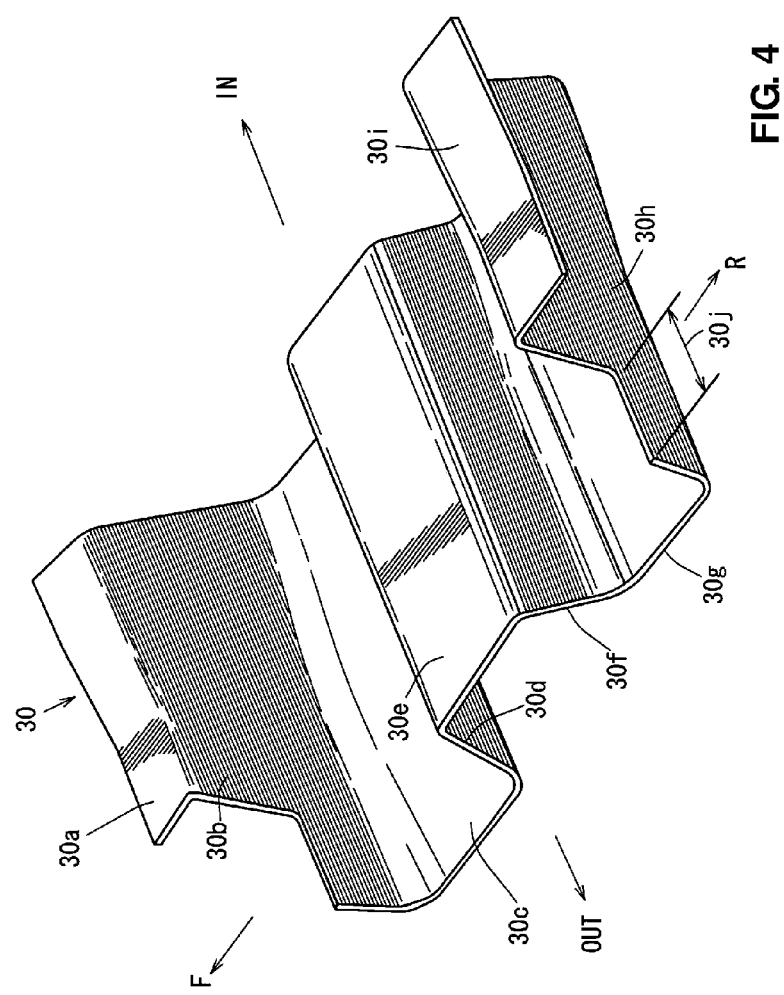
FIG. 4 is a perspective view of a gusset.
Figure 5:
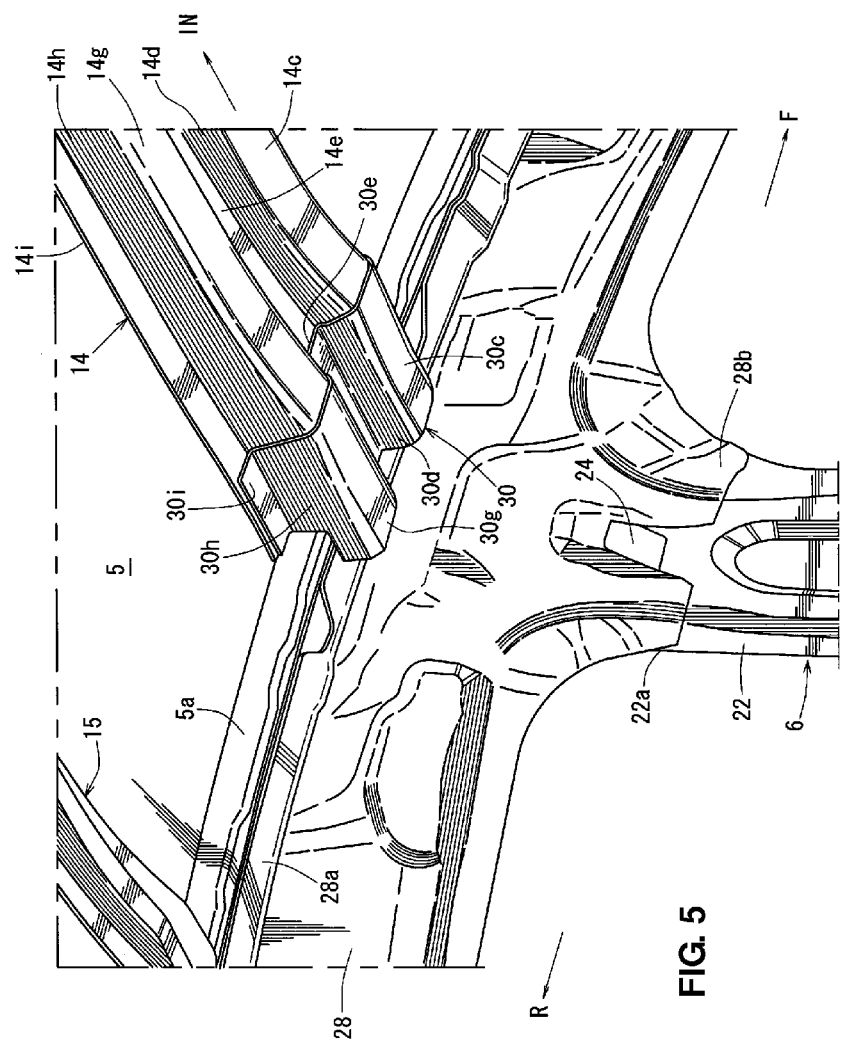
FIG. 5 is a perspective view of the upper vehicle-body structure, when viewed upward from the inside of a vehicle compartment.
Figure 6:
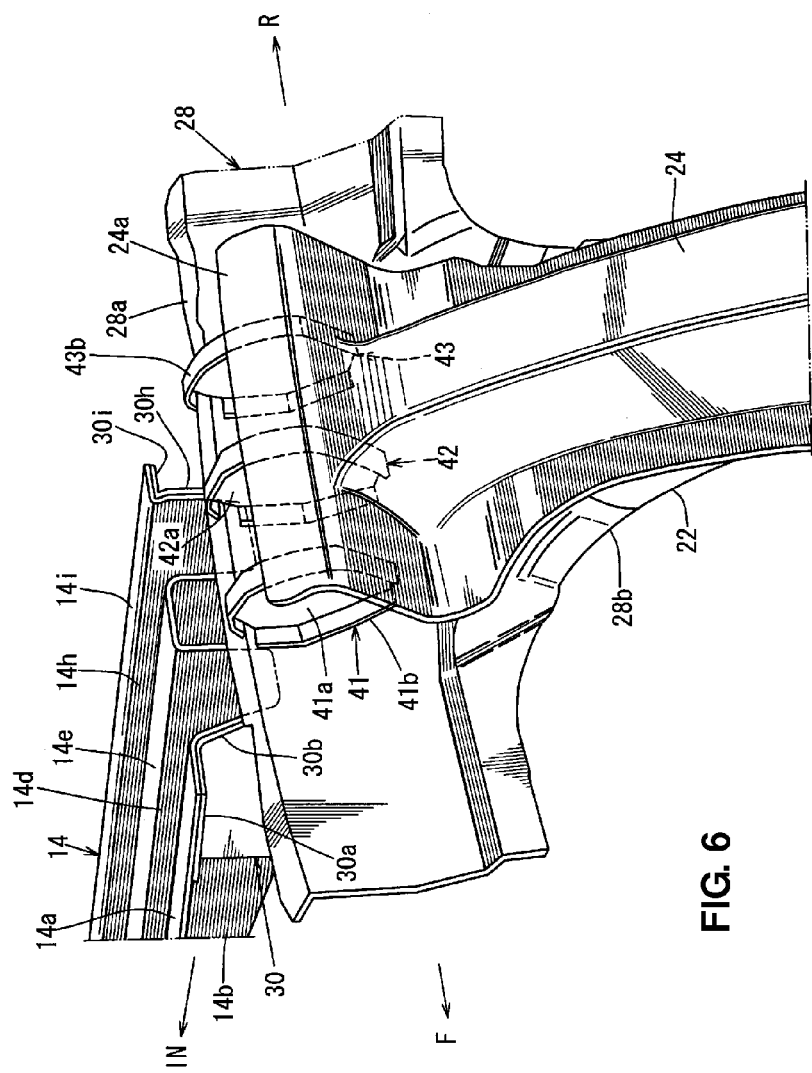
FIG. 6 is a perspective view showing a relationship of node-shaped plate members and a roof reinforcement.

FIG. 4 is a perspective view of a gusset, FIG. 5 is a perspective view of the upper vehicle-body structure, when viewed upward from the inside of a vehicle compartment, FIG. 6 is a perspective view showing a relationship of node-shaped plate members and a roof reinforcement, and FIG. 7 is a side view showing a relationship of the node-shaped plate members, the roof reinforcement, and the gusset. Herein, illustrations of the roof rail outer reinforcement 29 and the side outer panel 26 (including the roof rail outer portion 27) are omitted in FIG. 6, and illustrations of the roof rail inner 28, the roof rail outer reinforcement 29, the center pillar outer reinforcement 24 and the side outer panel 26 including the roof rail outer portion 27 are omitted in FIG. 7.

As shown in FIGS. 3, 5, 6 and 7, a gusset (specifically, a roof reinforcement gusset) 30 shown in FIG. 4 is joined to an end portion, in the vehicle width direction, of the roof reinforcement 14.

As shown in FIG. 4, the above-described gusset 30 is formed in a shape which corresponds to a shape of the end portion, in the vehicle width direction, of the roof reinforcement 14. That is, the above-described gusset 30 comprises a front-side flange portion 30a, a front piece portion 30b extending downward from a rear end of the flange portion 30a, a bottom piece portion 30c extending rearward from a lower end of the front piece portion 30b, a middle vertical wall portion 30d rising upward from a rear end of the bottom piece portion 30c, an upper piece portion 30e extending rearward from an upper end of the middle vertical wall portion 30d, a middle vertical wall portion 30f extending downward from a rear end of the upper piece portion 30e, a bottom piece portion 30g extending rearward from a lower end of the middle vertical wall portion 30f, a rear piece portion 30h rising upward from a rear end of the bottom piece portion 30g, and a rear-side flange portion 30i extending rearward from an upper end of the rear piece portion 30h, which are integrally formed substantially in a W shape in the side view so as to correspond to the substantial W shape of the end portion of the roof reinforcement 14.

As shown in FIG. 3, the above-described gusset 30 has an extension portion 30j which is located on the vehicle-outward side of the end portion of the roof reinforcement 14 and has a height which is shorter than the entire height of the gusset 30, specifically shorter than a half of the entire height in the present embodiment. This extension portion 30j is located below and apart from the above-described panel joint portion 20.

Figure 13:
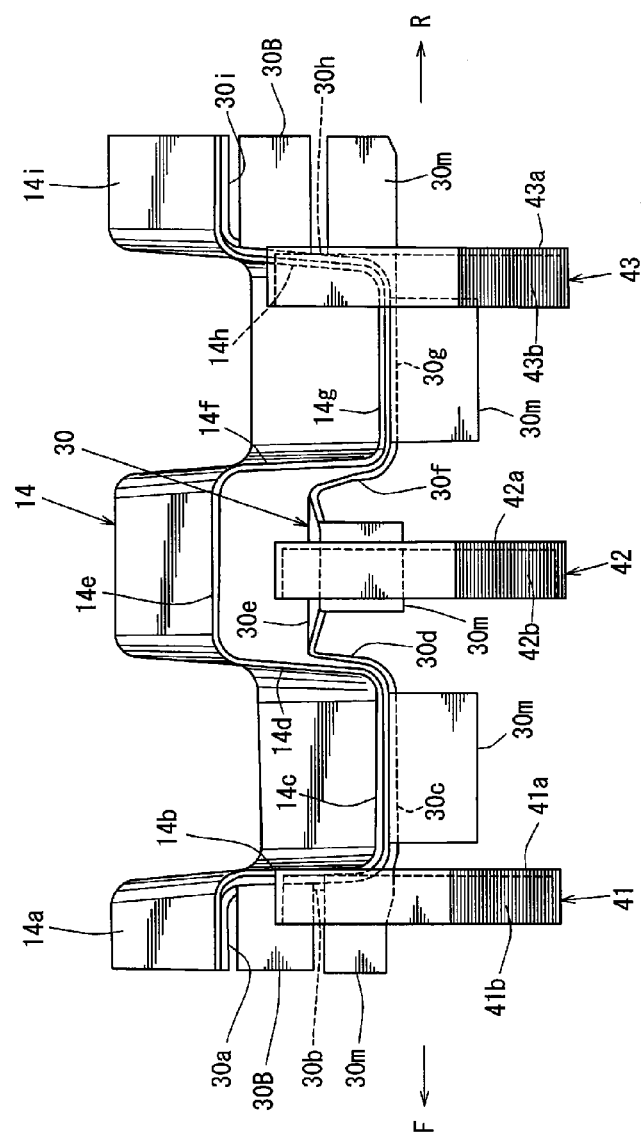
FIG. 13 is a side view showing the relationship of the node-shaped plate members, the roof reinforcement, and the gusset.

Further, as shown in FIG. 7, the respective flange portions 30a, 30i of the gusset 30 are jointly fixed to lower portions of the respective flange portions 14a, 14i of the roof reinforcement 14 by joint means, such as spot welding. Herein, as shown in FIGS. 7 and 13, the gusset 30, excluding the extension portion 30j, and the end portion of the roof reinforcement 14 are formed in a double structure for a strength improvement.

Also, as shown in FIG. 3, the roof reinforcement 14 and the gusset 30 are not joined to the above-described panel joint portion 20 so that there is provided a non-joint structure of the both 14, 30 and panel joint portion 20 and also a separate portion 31 where the roof rail inner 28 of the roof rail 4 and the extension portion 30j of the gusset 30 are apart from each other is formed. Thus, it is configured such that the side collision is inputted to the roof reinforcement 14 in an initial stage of the vehicle side collision.

Figure 8:
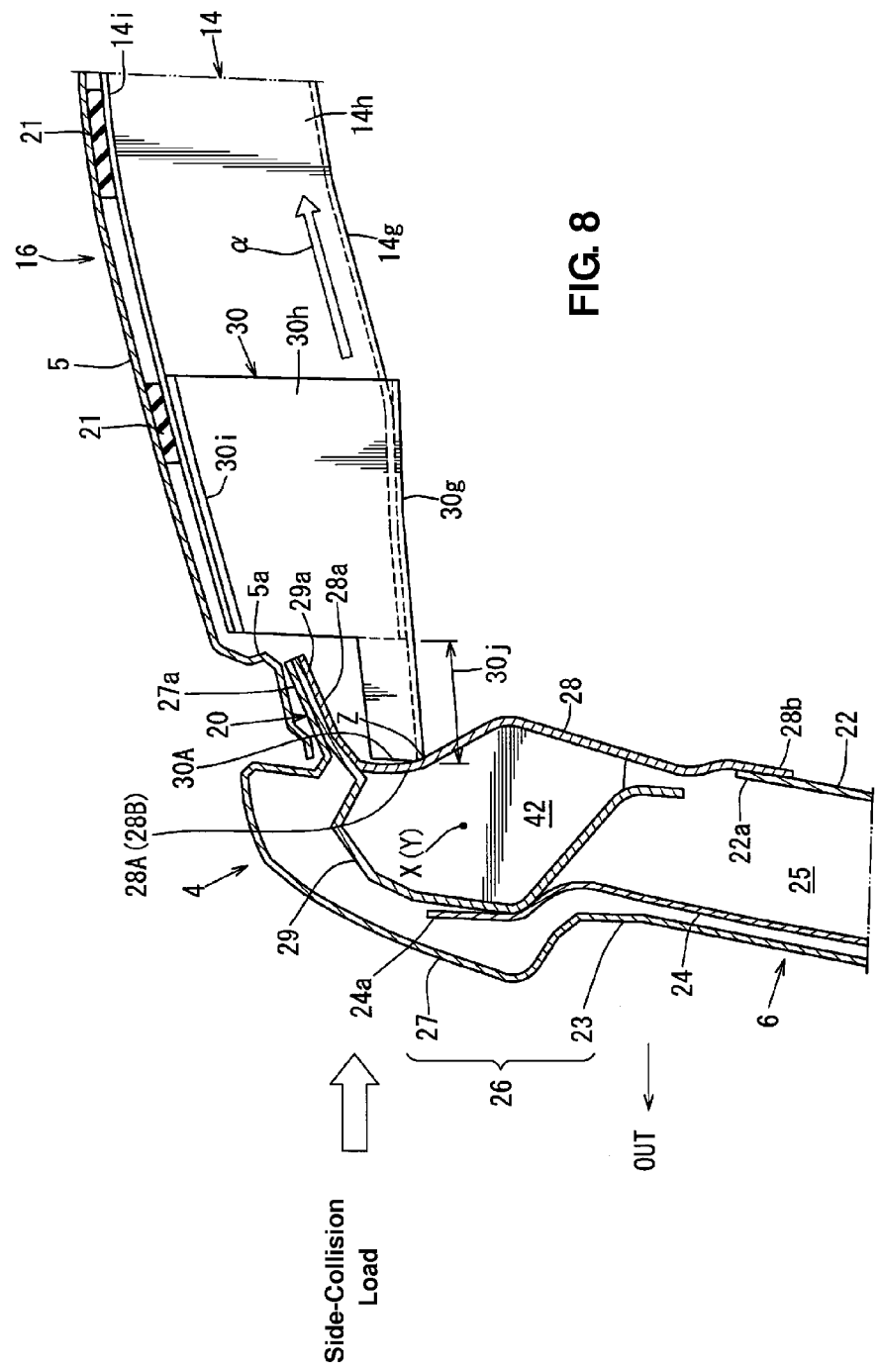
FIG. 8 is a sectional view showing a state of deformation in a vehicle side collision.

As shown in FIG. 3, the above-described separate portion 31 is located below the panel joint portion 20. That is, the center of a cross section (gravity center) X of the roof rail 4 becomes a load input point Y in the vehicle side collision, the center pillar 6 and the roof rail 4 come to deform as shown in FIG. 8 from their normal state shown in FIG. 3 in the vehicle side collision, and the center of rotation (i.e., an acting point) Z of the roof rail 4 becomes a contact point when the roof rail inner 28 and the vehicle-outward end portion of the gusset 30 contact each other. Accordingly, by positioning the separate portion 31 below the panel joint portion 20, that is—at as an outward position in the vehicle width direction as possible, the center of rotation (the acting point) Z is located at a vehicle-outward position so that a bending moment can be properly small.

The above-described bending moment can be indicated by the following equation.

Bending Moment=Force×(Distance between Load Input Point Y and Acting Point Z)

As described above, by positioning the separation portion 31 below the panel joint portion 20, the distance between the load input point Y (i.e., the position of the center of cross section X) and the acting point Z (see FIG. 8) is made short, so that the bending moment for the roof reinforcement 14 is made small. Thereby, the load with the bending moment becoming properly small is transmitted to the roof reinforcement 14.

Further, as shown in FIG. 3, the roof rail 4 comprises the roof rail outer portion 27 of the side outer panel 26, the roof rail outer reinforcement 29, and the roof rail inner 28. The roof rail inner 28 has a gusset-facing face 28A which is formed substantially vertically and faces the gusset 30. This gusset-facing face 28A is configured substantially perpendicularly to an axial direction (a longitudinal direction) of the roof reinforcement 14, which forms a load-transmission face 28B.

At the above-described separate portion 31, the load-transmission face 28B of the roof rail inner 28 and the facing face 30A of the outward end portion, in the vehicle width direction, of the gusset 30 are arranged substantially in parallel to each other. Thus, when the side collision is inputted, the inputted load is transmitted to the roof reinforcement 14 substantially in its axial direction (see an arrow a direction of FIG. 8). And, when the load-transmission face 28B and the facing face 30A of the gusset 30 collide with each other (see FIG. 8), the panel joint 20, the load-transmission face 28B, and the gusset 30 constitute together substantially a U-shaped structure having a high rigidity. Accordingly, the panel joint portion 20 is restrained from getting separated by a reaction force which is transmitted from the gusset 30 to the roof rail 4.

Herein, as shown in FIGS. 3, 6 and 7, plural node-shaped plate members 41, 42, 43 are provided inside the roof rail 4 at positions which overlap the roof reinforcement 14 and the gusset 30 longitudinally and vertically, that is—between the roof rail inner 28 and the roof rail outer reinforcement 29 such that the shape of the cross section of the roof rail 4, especially the shape of the closed cross section between the roof rail inner 28 and the roof rail outer reinforcement 29 can be maintained by the node-shaped plate members 41, 42, 43. The respective node-shaped plate members 41, 42, 43 comprise, as shown in FIGS. 6 and 7, bodies 41a, 42a, 43a and flange portions 41b, 42b, 43b which are bent longitudinally (forward in the present embodiment) from the bodies 41a, 42a, 43a and jointly fixed to the roof rail inner 28 and the roof rail outer reinforcement 29 which are formed integrally.

In the present embodiment, three members are used as the plural node-shaped plate members 41, 42, 43, and, as shown in FIG. 7, the front node-shaped plate member 41 overlaps the front piece portion 14b of the roof reinforcement 14 and the front piece portion 30b of the gusset 30 longitudinally and vertically, the middle node-shaped plate member 42 overlaps the upper piece portion 30e of the gusset 30 longitudinally and vertically, and the rear node-shaped plate member 43 overlaps the rear piece portion 14h of the roof reinforcement 14 and the rear piece portion 30h of the gusset 30 longitudinally and vertically, so that the input load in the vehicle side collision (excluding the initial stage of collision) is transmitted to the gusset 30 and the roof reinforcement 14.

As described above, the node-shaped plate members 41, 42, 43 are provided inside the roof rail 4 such that the cross section of the roof rail 4 does not crush in the vehicle side collision, so that the shape of the cross section of the roof rail 4 can be maintained by the node-shaped plate members 41, 42, 43. Thereby, the side-collision load can be transmitted substantially in the axial direction of the roof reinforcement 14 via the gusset 30 in a state in which its bending element is properly small.

Further, as shown in FIG. 3, the center of the cross section (i.e., the gravity center) X of the roof rail 4 is located at the position overlapping the above-described load-transmission face 28B vertically so that the side-collision load can be transmitted substantially in the axial direction of the roof reinforcement 14 in the vehicle side collision. In the present embodiment, as shown in FIG. 3, the upper portion of the roof rail 4, especially the upper portions of the node-shaped plate members 41, 42, 43 and the upper portion of the roof rail outer reinforcement 29 project upward beyond the panel joint portion 20 such that the center of the cross section X of the roof rail 4 is located at the position which overlaps the load-transmission face 28B vertically. Thereby, a vertically-overlapping structure of the load-transmission face 28B and the center of the cross section X can be properly ensured with a relatively simple structure. In the drawings, an arrow F shows a vehicle forward direction, an arrow R shows a vehicle rearward direction, and an arrow IN shows a vehicle inward direction, and an arrow OUT shows a vehicle outward direction.

As described above, the upper vehicle-body structure of a vehicle of the above-described embodiment comprises the pair of right-and-left roof rails 4 provided at the right-and-left both end portions of the roof portion 16 of the vehicle body and extending in the vehicle longitudinal direction, the roof rail having the panel joint portion 20 (the so-called Mohican portion) having the recess-shaped cross section where the plural panels (see the respective elements 27a, 29a, 28a) are overlapped vertically and joined together at the inward end portion, in the vehicle width direction, of the roof rail 4, the roof panel 5 provided between the pair of right-and-left roof rails 4, 4, the roof reinforcement 14 extending in the vehicle width direction below the roof panel 5, the center pillar 6, the upper portion of which is joined to the roof rail 4 at the position which overlaps the roof reinforcement 14 in the vehicle longitudinal direction, the center pillar 6 extending downward from the upper portion thereof, the gusset 30 joined to the end portion, in the vehicle width direction, of the roof reinforcement 14, and the node-shaped plate members 41, 42, 43 provided inside the roof rail 4 (specifically, between the respective elements 28, 29) at the position which overlaps the roof reinforcement 14 longitudinally and vertically (see FIGS. 3, 6 and 7).

According to the present embodiment, since the node-shaped plate members 41, 42, 43 are provided inside the roof rail 4 at the position which overlaps the roof reinforcement 14 longitudinally and vertically, so that the shape of the cross section of the roof rail 4 can be maintained by the node-shaped plate members 41, 42, 43 such that the cross section of the roof rail 4 may not crush in the vehicle side collision, the side-collision load can be transmitted substantially in the axial direction of the roof reinforcement 14 via the gusset 30 in a state in which its bending element is properly small. Accordingly, buckling of a portion of the roof reinforcement 14 which is located in the vicinity of a roof side can be effectively restrained.

Also, the roof rail 4 comprises the roof rail outer (see the roof rail outer portion 27) and the roof rail inner 28, the gusset-facing face 28A of the roof rail inner 28 which is arranged substantially perpendicularly to the axial direction of the roof reinforcement 14 forms the load-transmission face 28B, and the center of the cross section X of the roof rail 4 is located at the position which overlaps the load-transmission face 28B vertically (see FIG. 3). Thereby, since the load-transmission face 28B and the end portion of the roof reinforcement 14 are substantially in parallel to each other and the center of the cross section (i.e., the gravity center) X of the roof rail 4 is located at the position overlapping the load-transmission face 28B vertically, the side-collision load can be transmitted substantially in the axial direction of the roof reinforcement 14 in a state in which the cross section of the roof rail does not crush, so that the buckling of the portion of the roof reinforcement 14 located in the vicinity of the roof side can be effectively restrained.

Further, the upper portion of the roof rail 4 projects upward beyond the panel joint portion 20 such that the center of the cross section X of the roof rail 4 is located at the position which overlaps the load-transmission face 28B vertically (see FIG. 3). Thereby, the center of the cross section (the gravity center) X of the roof rail 4 can be located at the position overlapping the load-transmission face 28B vertically with a relatively simple structure. Accordingly, the side-collision load can be transmitted substantially in the axial direction of the roof reinforcement 14 in the vehicle side collision despite its simple structure, so that the buckling of the portion of the roof reinforcement 14 located in the vicinity of the roof side can be effectively restrained.

Moreover, the roof reinforcement 14 and the gusset 30 are not joined to the panel joint portion 20 such that the separate portion 31 where the roof rail 4 and the gusset 30 are apart from each other is formed (see FIG. 3). Thereby, since the above-described separate portion 31 is provided, the upper portion of the center pillar 6 and the portion of the roof rail 4 which corresponds to this portion can be made, in the initial stage of the vehicle side collision, to deform freely in the range of the separate portion 31. Accordingly, the side-collision load is not inputted to the roof reinforcement 14 in the initial stage of the vehicle-side collision, so that this load can be received by a torsional deformation and a bending deformation of the roof rail 4. Then, since the decreased load is transmitted to the roof reinforcement 14, the buckling of the portion of the roof reinforcement 14 located in the vicinity of the roof side can be effectively restrained. Further, since the roof reinforcement 14 and the gusset 30 are not joined to the panel joint portion 20 (Mohican portion) so that there is provided a non-joint structure, it can be prevented that the welding of the panel joint portion 20 gets separated (i.e., the spot welding of the panel joint portion gets broken). Herein, in a case in which the roof reinforcement and the gusset are joined to the panel joint portion, the panel joint portion is pulled by the gusset when deforming, so that the welding portion may get separated inappropriately.

Additionally, the separate portion 31 is positioned below the panel joint portion 20 (see FIG. 3). Thereby, since the separate portion 31 is positioned below the panel joint portion 20, i.e., at as an outward position in the vehicle width direction as possible, the distance between the load input point Y (see the center of the cross section X of the closed cross section of the roof rail 4) and the acting point Z (see FIG. 8) can be properly small. Accordingly, the bending moment for the roof reinforcement 14 can be small, so that the small load of the bending moment can be transmitted to the roof reinforcement 14. Consequently, the buckling of the portion of the roof reinforcement 14 located in the vicinity of the roof side can be effectively restrained.

Further, the load-transmission face 28B and the facing face 30A of the gusset 30 are arranged substantially in parallel to each other at the separate portion 31 (see FIG. 3). Thereby, the side-collision load is transmitted substantially in the axial direction of the roof reinforcement 14 when being inputted in the vehicle side collision, and when the load-transmission face 28B of the roof rail inner 28 and the facing face 30A of the end portion of the gusset 30 collide with each other, the panel joint portion 20, the load-transmission face 28B of the roof rail inner 28, and the gusset 30 constitute together substantially a U-shaped structure having a high rigidity. Accordingly, the panel joint portion 20 can be restrained from getting separated by a reaction force which is transmitted from the gusset 30 to the roof rail 4.

Figure 9:
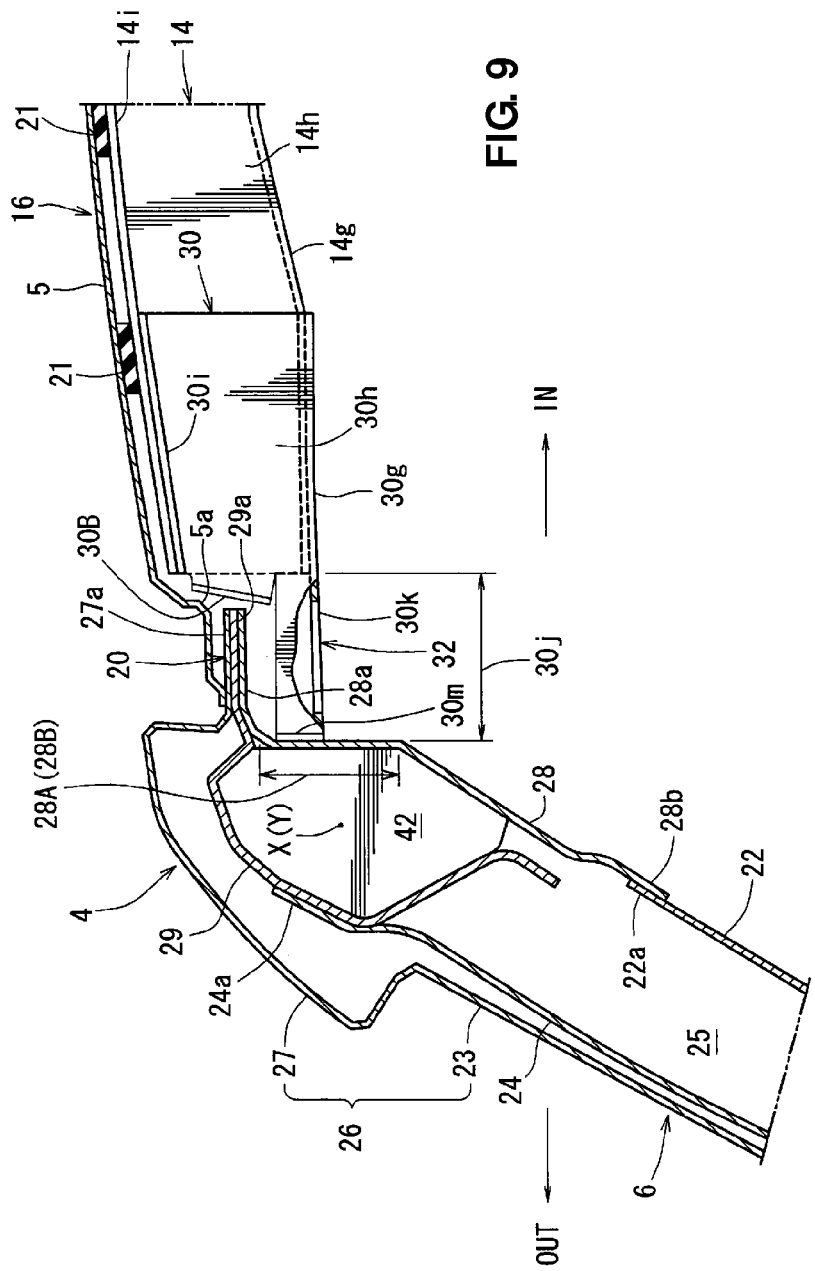
FIG. 9 is a sectional view showing another embodiment of the upper vehicle-body structure of a vehicle.
Figure 10:
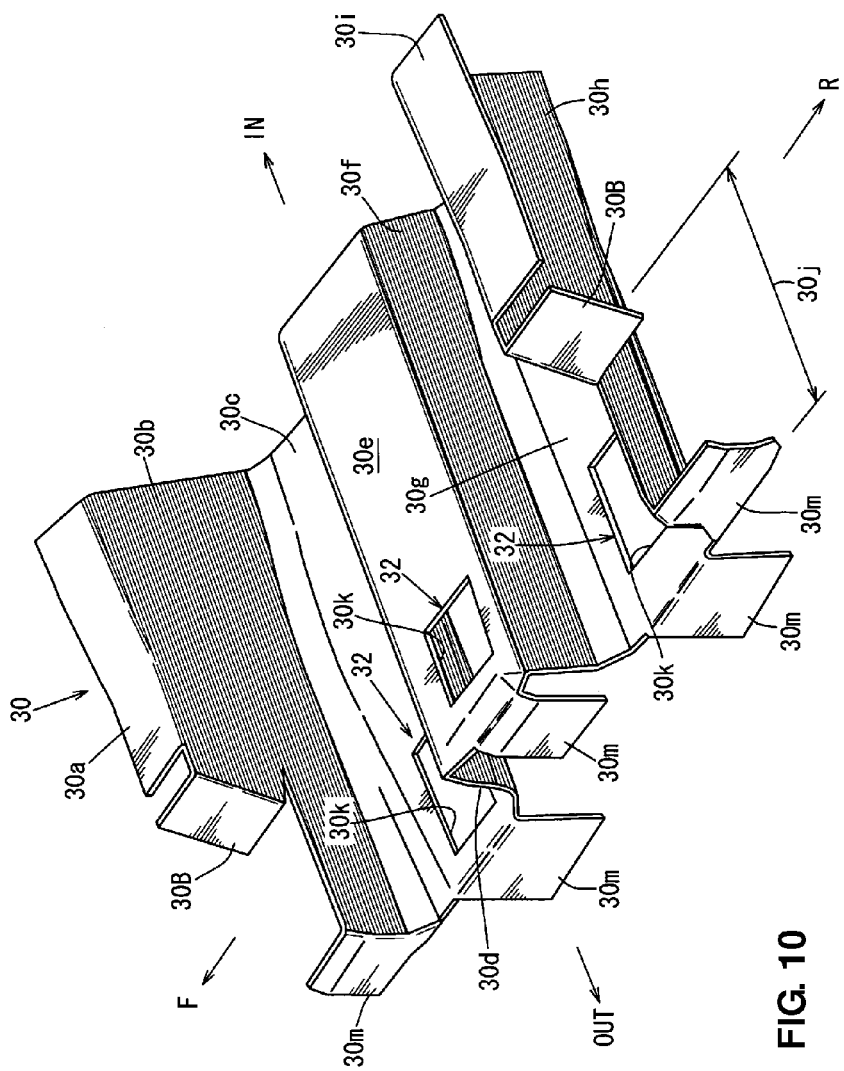
FIG. 10 is a perspective view of a gusset.
Figure 11:
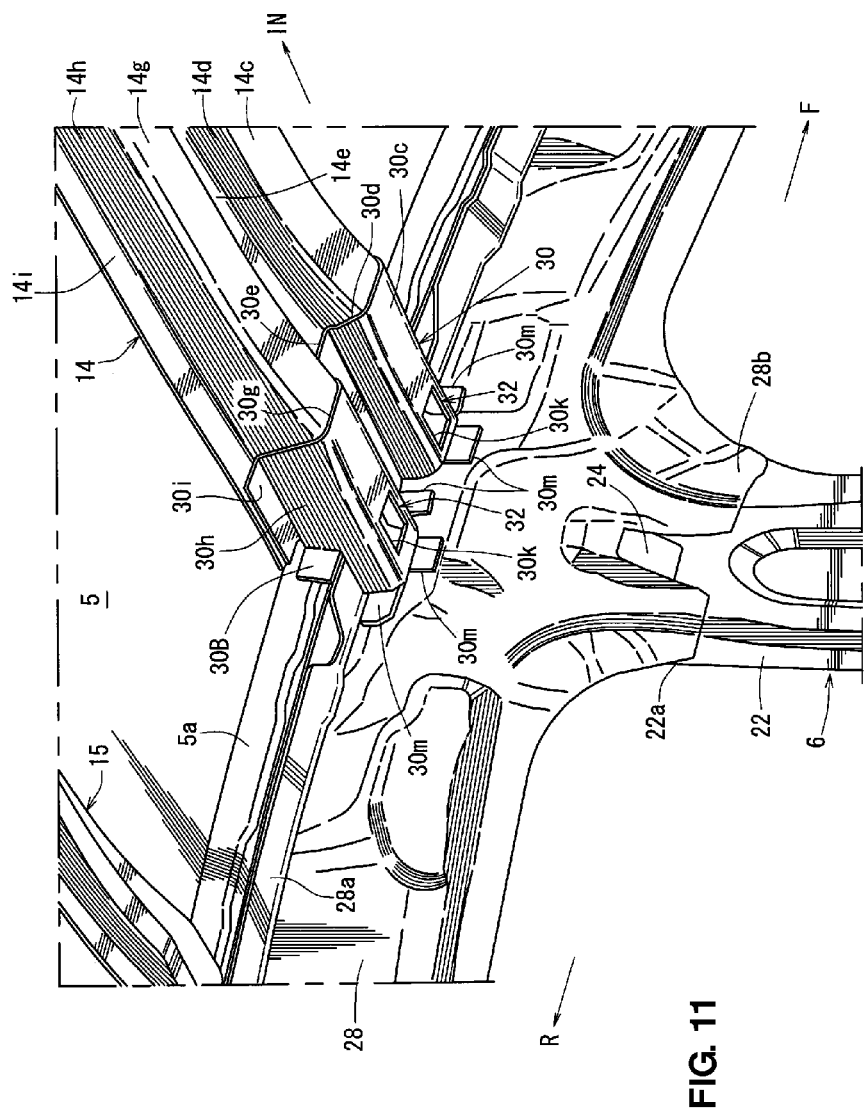
FIG. 11 is a perspective view of the upper vehicle-body structure, when viewed upward from the inside of the vehicle compartment.
Figure 12:
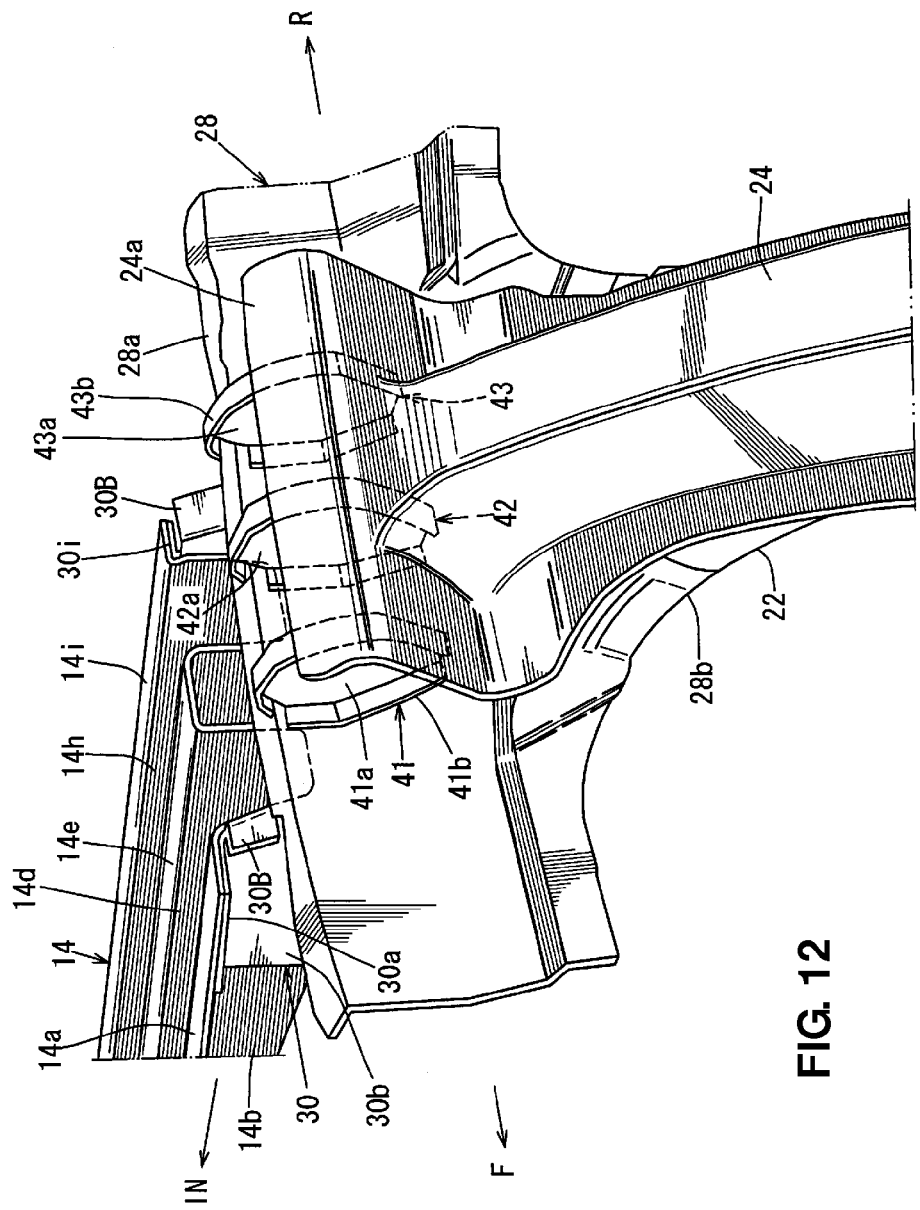
FIG. 12 is a perspective view showing a relationship of node-shaped plate members, a roof reinforcement, and a gusset.

FIGS. 9-13 show another embodiment of the upper vehicle-body structure of a vehicle. FIG. 9 is a sectional view A-A of FIG. 1 (a back view corresponding to FIG. 3), FIG. 10 is a perspective view of a gusset (a view corresponding to FIG. 4), FIG. 11 is a perspective view of the upper vehicle-body structure, when viewed upward from the inside of the vehicle compartment (a view corresponding to FIG. 5), FIG. 12 is a perspective view showing a relationship of node-shaped plate members, a roof reinforcement, and a gusset (a view corresponding to FIG. 6), and FIG. 13 is a side view showing the relationship of the node-shaped plate members, the roof reinforcement, and the gusset (a view corresponding to FIG. 7). Herein, in this embodiment as well as the above-described embodiment, while a left side of the upper vehicle-body structure will be explained, the upper vehicle-body structure is configured to be substantially symmetrical about the center line of the vehicle.

While the above-described embodiment shown in FIGS. 1-8 shows an example equipped with the separate portion 31, this example shown in FIGS. 9-13 shows an example in which a weakness portion 32 which is weak is formed in the vicinity of the connection portion of the roof rail 4 and a gusset 30 instead of the separate portion 31 so that the side collision is not inputted to the roof reinforcement 14 in the initial stage of the vehicle side collision. That is, as shown in FIGS. 9 and 10, opening portions 30k . . . are formed at bottom piece portions 30c, 30g and an upper piece portion 30e of an extension portion 30j of the gusset 30, and the above-described weakness portion 32 is constituted by the opening portions 30k.

In this embodiment, the extension portion 30j extends up to a position which reaches the roof rail inner 28, and attachment pieces 30m . . . are respectively formed at the front piece portion 30b, the bottom piece portions 30c, 30g, the upper piece portion 30e, and the rear piece portion 30h of an end portion of the extension portion 30j. The attachment pieces 30m . . . are integrally formed by being bent. Further, as shown in FIG. 9, the above-described weakness portion 32 is formed apart from and below the panel joint portion 20 such that the distance between the load input point Y and the acting point is small, so that the bending moment for the roof reinforcement 14 can be properly small.

Moreover, as shown in FIGS. 9 and 10, facing face portions 30B which face the load-transmission face 28B of the roof rail inner 28 substantially in parallel to this face 28B are formed at a position which corresponds to an inward end portion, in the vehicle width direction, of the weakness portion 32, that is—at a position which corresponds to an inward end portion, in the vehicle width direction, of the opening portion 30k, such that the side-collision load is transmitted substantially in the axial direction of the roof reinforcement 14. Further, the gusset 30 is configured to be attachable to the roof rail inner 28 via the above-described attachment pieces 30m, so that assembling to the vehicle body can be improved properly. In this embodiment, the above-described facing face portions 30B are formed by being bent in the vehicle longitudinal direction respectively from the front piece portion 30b and the rear piece portion 30h of the gusset 30.

As described above, according to this embodiment shown in FIGS. 9-13, the above-described roof reinforcement 14 and the gusset 30 are not joined to the panel joint portion 20 such that the weakness portion 32 is formed in the vicinity of the connection portion of the roof rail 4 and the gusset 30 (see FIGS. 9 and 10).

According to this structure, since the above-described weakness portion 32 is provided, the upper portion of the center pillar 6 and a portion of the roof rail 4 which corresponds to this portion can make the weakness portion 32 crush. Accordingly, the side-collision load is not inputted to the roof reinforcement 14 in the initial stage of the vehicle-side collision, so that this load can be received by the torsional deformation and the bending deformation of the roof rail 4. Then, since the decreased load is transmitted to the roof reinforcement 14, the buckling of the portion of the roof reinforcement 14 located in the vicinity of the roof side can be effectively restrained. Further, since the roof reinforcement 14 and the gusset 30 are not joined to the panel joint portion (Mohican portion) 20 so that there is provided a non-joint structure, it can be prevented that the welding of the panel joint portion 20 gets separated (i.e., the spot welding of the panel joint portion gets broken). Herein, in a case in which the roof reinforcement and the gusset are joined to the panel joint portion, the panel joint portion is pulled by the gusset when deforming, so that the welding portion may get separated inappropriately.

Additionally, the weakness portion 32 is positioned below the panel joint portion 20 (see FIG. 9). Thereby, since the weakness portion 32 is positioned below the panel joint portion 20, i.e., at as the outward position in the vehicle width direction as possible, the distance between the load input point Y (see the center of the cross section X of the closed cross section of the roof rail 4) and the acting point can be properly small. Accordingly, the bending moment for the roof reinforcement 14 can be small, so that the small load of the bending moment can be transmitted to the roof reinforcement 14. Consequently, the buckling of the portion of the roof reinforcement 14 located in the vicinity of the roof side can be effectively restrained.

Further, the facing portion (see the facing face portion 30B) which is substantially in parallel to the load-transmission face 28B is formed at the position which corresponds to the inward end portion, in the vehicle width direction, of the weakness portion 32 (see FIG. 9). According to this structure, since the load-transmission face 28B of the roof rail inner 28 and the facing portion (see the facing face 30B) located of the gusset 30 are configured substantially in parallel to each other, the side-collision load is transmitted substantially in the axial direction of the roof reinforcement 14 when being inputted in the vehicle side collision, and also the gusset 30 can be attached to the roof rail inner 28, so that assembling to the vehicle body can be improved properly.

Since this embodiment shown in FIGS. 9-13 is similar to the previously-described embodiment shown in FIGS. 1-8 in its other structures, operations and effects, the same portions of this embodiment are denoted by the same reference characters in FIGS. 9-13 and their specific descriptions are omitted here.

The roof rail outer of the present invention corresponds to the roof rail outer portion 27 formed by the side outer panel 26 of the embodiments. Likewise, the facing portion provided substantially in parallel to the load-transmission face of the weakness portion corresponds to the facing face 30B. However, the present invention should not be limited to the above-described embodiment, and any other modifications or improvements may be applied within the scope of a sprit of the present invention.

For example, while the front and rear flange portions 30a, 30b of the gusset 30 are jointly fixed to the roof reinforcement 14 in the above-described embodiments, the upper piece portion 30e may be also jointly fixed to roof reinforcement 14 additionally. Further, while in total three of the node-shaped plate members 41, 42, 43 which are apart from each other are provided in the above-described embodiments, plural node-shaped plate members may be provided at positions which correspond to the front piece portion 30b, the middle vertical wall portions 30d, 30f, and the rear piece portion 30h.

What is claimed is:

1. An upper vehicle-body structure of a vehicle, comprising:
   a pair of right-and-left roof rails provided at right-and-left both end portions of a roof portion of the vehicle and extending in a vehicle longitudinal direction, the roof rail having a panel joint portion having a recess-shaped cross section where plural panels are overlapped vertically and joined together at an inward end portion, in a vehicle width direction, of the roof rail;
   a roof panel provided between the pair of right-and-left roof rails;
   a roof reinforcement extending in the vehicle width direction below the roof panel;
   a center pillar, an upper portion of which is joined to the roof rail at a position which overlaps the roof reinforcement in the vehicle longitudinal direction, the center pillar extending downward from the upper portion thereof;
   a gusset joined to an end portion, in the vehicle width direction, of the roof reinforcement; and
   a node-shaped plate member provided inside the roof rail at a position which overlaps the roof reinforcement longitudinally and vertically,
   wherein said roof rail comprises a roof rail outer and a roof rail inner, a gusset-facing face of the roof rail inner which is arranged substantially perpendicularly to an axial direction of said roof reinforcement forms a load-transmission face, and a center of a cross section of the roof rail is located at a position which overlaps the load-transmission face vertically,
   wherein the upper portion of said roof rail projects upward beyond said panel joint portion such that the center of the cross section of the roof rail is located at a position which overlaps said load-transmission face vertically,
   wherein said roof reinforcement and said gusset are not joined to said panel joint portion such that a separate portion where the roof rail and the gusset are apart from each other is formed, or a weakness portion is formed in the vicinity of a connection portion of the roof rail and the gusset.

2. The upper vehicle-body structure of a vehicle of claim 1, wherein a facing portion which is substantially in parallel to said load-transmission face is formed at a position which corresponds to an inward end portion, in the vehicle width direction, of said weakness portion.

3. An upper vehicle-body structure of a vehicle, comprising:
   a pair of right-and-left roof rails provided at right-and-left both end portions of a roof portion of the vehicle and extending in a vehicle longitudinal direction, the roof rail having a panel joint portion having a recess-shaped cross section where plural panels are overlapped vertically and joined together at an inward end portion, in a vehicle width direction, of the roof rail;
   a roof panel provided between the pair of right-and-left roof rails;
   a roof reinforcement extending in the vehicle width direction below the roof panel;
   a center pillar, an upper portion of which is joined to the roof rail at a position which overlaps the roof reinforcement in the vehicle longitudinal direction, the center pillar extending downward from the upper portion thereof;
   a gusset joined to an end portion, in the vehicle width direction, of the roof reinforcement; and
   a node-shaped plate member provided inside the roof rail at a position which overlaps the roof reinforcement longitudinally and vertically,
   wherein said roof rail comprises a roof rail outer and a roof rail inner, a gusset-facing face of the roof rail inner which is arranged substantially perpendicularly to an axial direction of said roof reinforcement forms a load-transmission face, and a center of a cross section of the roof rail is located at a position which overlaps the load-transmission face vertically,
   wherein said roof reinforcement and said gusset are not joined to said panel joint portion such that a separate portion where the roof rail and the gusset are apart from each other is formed, or a weakness portion is formed in the vicinity of a connection portion of the roof rail and the gusset.

4. The upper vehicle-body structure of a vehicle of claim 3, wherein said separate portion or said weakness portion are positioned below said panel joint portion.

5. The upper vehicle-body structure of a vehicle of claim 4, wherein a facing portion which is substantially in parallel to said load-transmission face is formed at a position which corresponds to an inward end portion, in the vehicle width direction, of said weakness portion.

6. The upper vehicle-body structure of a vehicle of claim 3, wherein said load-transmission face and a facing face of an end portion of said gusset are arranged substantially in parallel to each other at said separate portion.

7. The upper vehicle-body structure of a vehicle of claim 3, wherein a facing portion which is substantially in parallel to said load-transmission face is formed at a position which corresponds to an inward end portion, in the vehicle width direction, of said weakness portion.

8. An upper vehicle-body structure of a vehicle, comprising:
   a pair of right-and-left roof rails provided at right-and-left both end portions of a roof portion of the vehicle and extending in a vehicle longitudinal direction, the roof rail having a panel joint portion having a recess-shaped cross section where plural panels are overlapped vertically and joined together at an inward end portion, in a vehicle width direction, of the roof rail;
   a roof panel provided between the pair of right-and-left roof rails;

a roof reinforcement extending in the vehicle width direction below the roof panel;

a center pillar, an upper portion of which is joined to the roof rail at a position which overlaps the roof reinforcement in the vehicle longitudinal direction, the center pillar extending downward from the upper portion thereof;

a gusset joined to an end portion, in the vehicle width direction, of the roof reinforcement; and a node-shaped plate member provided inside the roof rail at a position which overlaps the roof reinforcement longitudinally and vertically, wherein said roof reinforcement and said gusset are not joined to said panel joint portion, a separate portion where the roof rail and the gusset are apart from each other is formed or a weakness portion is formed in the vicinity of a connection portion of the roof rail and the gusset such that a side-collision load is not inputted to the roof reinforcement from the roof rail in an initial stage of a vehicle-side collision, and said separate portion or said weakness portion are positioned below and apart from said panel joint portion, without contacting the panel joint portion.

9. The upper vehicle-body structure of a vehicle of claim 8, wherein said roof rail comprises a roof rail outer and a roof rail inner, a gusset-facing face of the roof rail inner which is arranged substantially perpendicularly to an axial direction of said roof reinforcement forms a load-transmission face, and a center of a cross section of the roof rail is located at a position which overlaps the load-transmission face vertically.

10. The upper vehicle-body structure of a vehicle of claim 9, wherein the upper portion of said roof rail projects upward beyond said panel joint portion such that the center of the cross section of the roof rail is located at a position which overlaps said load-transmission face vertically.

11. The upper vehicle-body structure of a vehicle of claim 9, wherein a facing portion which is substantially in parallel to said load-transmission face is formed at a position which corresponds to an inward end portion, in the vehicle width direction, of said weakness portion.

12. The upper vehicle-body structure of a vehicle of claim 9, wherein said load-transmission face and a facing face of an end portion of said gusset are arranged substantially in parallel to each other at said separate portion.

\* \* \* \* \*